US010723353B2

(12) United States Patent
Takeuchi

(10) Patent No.: US 10,723,353 B2
(45) Date of Patent: Jul. 28, 2020

(54) VEHICLE CONTROL APPARATUS

(71) Applicant: Toyota Jidosha Kabushiki Kaisha, Toyota-shi, Aichi-ken (JP)

(72) Inventor: Koji Takeuchi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 292 days.

(21) Appl. No.: 15/896,717

(22) Filed: Feb. 14, 2018

(65) Prior Publication Data

US 2018/0257646 A1    Sep. 13, 2018

(30) Foreign Application Priority Data

Mar. 7, 2017    (JP) .................................. 2017-042449

(51) Int. Cl.
*B60W 30/09* (2012.01)
*B60W 30/095* (2012.01)
(Continued)

(52) U.S. Cl.
CPC .... *B60W 30/0956* (2013.01); *B60W 30/0953* (2013.01); *B60W 30/18163* (2013.01);
(Continued)

(58) Field of Classification Search
CPC ......... B60W 30/0956; B60W 30/0953; B60W 30/18163; B60W 50/0097; B60W 10/18;
(Continued)

(56) References Cited

U.S. PATENT DOCUMENTS

2008/0291000 A1* 11/2008 Kim ...................... G01S 7/4813
340/436
2009/0088925 A1* 4/2009 Sugawara ............. B60W 30/12
701/41
(Continued)

FOREIGN PATENT DOCUMENTS

DE    102005023185 A1    11/2006
DE    102005062275 A1    6/2007
(Continued)

OTHER PUBLICATIONS

Office Action dated Feb. 4, 2020 in German Patent Appln. No. 102017128671.3.

*Primary Examiner* — Mary Cheung
(74) *Attorney, Agent, or Firm* — Dinsmore & Shohl LLP

(57) ABSTRACT

Rear lateral detection (RLL) ECU 10 determines whether or not a lane change assist control (LCA) is being performed. The RLDECU 10 sets a performing condition for performing a rear-end pre-crash safety control (rear PCS control) to a moderate performing condition when the LCA is being performed, and sets the performing condition of the rear PCS control to a normal performing condition when the LCA is not being performed. The moderate performing condition is set such that the rear PCS control is performed more easily compared with the normal performing condition. For example, in the moderate performing condition, a detection area of a target vehicle which is a vehicle subject to the rear PCS control is expanded compared with the detection area in the normal performing condition.

13 Claims, 8 Drawing Sheets

(51) Int. Cl.
*B60W 30/18* (2012.01)
*G06K 9/00* (2006.01)
*B60W 50/00* (2006.01)

(52) U.S. Cl.
CPC ..... *B60W 50/0097* (2013.01); *G06K 9/00805* (2013.01); *G06K 9/00825* (2013.01)

(58) Field of Classification Search
CPC ...... B60W 10/20; B60W 10/30; B60W 30/09; G06K 9/00805; G06K 9/00825
See application file for complete search history.

(56) References Cited

U.S. PATENT DOCUMENTS

| | | | | |
|---|---|---|---|---|
| 2013/0050491 | A1* | 2/2013 | Lin | G08G 1/0962 348/148 |
| 2013/0085976 | A1* | 4/2013 | Bone | B60W 30/18163 706/46 |
| 2013/0166150 | A1* | 6/2013 | Han | B60W 10/18 701/42 |
| 2015/0149037 | A1* | 5/2015 | Lim | B60W 10/184 701/41 |
| 2015/0336547 | A1* | 11/2015 | Dagan | B60T 7/22 701/70 |
| 2016/0059858 | A1 | 3/2016 | Heinrich et al. | |
| 2017/0259734 | A1* | 9/2017 | Imaishi | B60Q 1/444 |
| 2018/0057002 | A1* | 3/2018 | Lee | B60W 30/16 |
| 2018/0244153 | A1* | 8/2018 | Ejiri | G02B 27/0101 |
| 2019/0023273 | A1* | 1/2019 | Ishioka | G08G 1/16 |
| 2019/0329780 | A1* | 10/2019 | Tomescu | B62D 15/029 |

FOREIGN PATENT DOCUMENTS

| | | |
|---|---|---|
| DE | 102013005248 A1 | 10/2014 |
| DE | 102014215959 A1 | 5/2015 |
| JP | 2010-201951 A | 9/2010 |

\* cited by examiner

VEHICLE CONTROL APPARATUS

CROSS-REFERENCE TO RELATED APPLICATIONS

This application claims priority to Japanese Patent Application No. 2017-042449 filed on Mar. 7, 2017, the entire contents of which are herein incorporated by reference.

TECHNICAL FIELD

The present disclosure relates to a vehicle control apparatus comprising a rear-end pre-crash safety system.

BACKGROUND ART

A rear-end pre-crash safety system which performs a rear-end pre-crash safety control which is a control to detect an approaching vehicle approaching an own vehicle from rear and to enhance safety against a collision of the approaching vehicle with the own vehicle has conventionally been known. The rear-end pre-crash safety control is a control to prevent the approaching vehicle from rear from colliding with the own vehicle, or a control to secure a safe posture for a driver in advance in preparation for a case where the approaching vehicle collides with the own vehicle.

For example, following controls, that is, a control to issue a warning to a driver of the approaching vehicle by blinking hazard lamps (Japanese Patent Application Laid-Open (kokai) No. 2010-201951), a control to adjust a front-rear position of a headrest, and a control to retract a seatbelt (eliminate a looseness of the seatbelt) have been known.

SUMMARY

The rear-end pre-crash safety control is performed when an approaching vehicle traveling at a rear side of the own vehicle, for example, on a traveling locus of the own vehicle is detected. Therefore, in a situation where the own vehicle is changing a lane, another vehicle approaching the own vehicle by traveling on an adjacent lane which is to be a new lane for the own vehicle after finishing the lane change is hardly to be a target of the rear-end pre-crash safety control, and therefore there is a possibility that the rear-end pre-crash safety control may be delayed.

For example, a lane change assist system to assist an operation of a lane change has been known. The lane change assist system changes a lane on which the own vehicle travels without an operation of a steering wheel by the driver by applying a steering torque on a steering mechanism by using an electric power steering system in a case when a lane change request is generated. In the lane change assist system as stated above, a periphery of the own vehicle is monitored by a periphery sensor, and a lane change is performed after being confirmed that there do not exist any obstacles such as other vehicles and the like which are to interfere with the lane change. The lane change assist system moves the own vehicle to an adjacent lane slowly by taking time in order to give a sense of security to the driver. Therefore, it is considered that, after a lane change assist control is started, there appears another vehicle rapidly approaching the own vehicle from rear on the adjacent lane which is to be a new lane for the own vehicle after finishing the lane change. In this case, the rear-end pre-crash safety control is not performed immediately because the other vehicle mentioned above is not traveling on the rear side of the own vehicle.

Besides, not limited to the lane change assist system, in a case where the lane change is performed by the driver's operation of the steering wheel as well, it is considered that, after the own vehicle starts the lance change, another vehicle traveling on the adjacent lane which is to be a new lane for the own vehicle after the lane change rapidly approaches the own vehicle. In such a case as well, there is a possibility that the rear-end pre-crash safety control may be delayed.

The present disclosure is made in order to resolve the problem above. That is, one of objects of the present disclosure is to operate the rear-end pre-crash safety control at an appropriate timing when performing the lane change.

In order to achieve the object above, one feature of a vehicle control apparatus of the present disclosure lies in that the vehicle control apparatus which comprises a rear-end pre-crash safety system (10, 30, 70, 80) which performs a rear-end pre-crash safety control which is a control to detect an approaching vehicle approaching an own vehicle from rear, and to enhance safety against a collision of the approaching vehicle with the own vehicle when a predetermined performing condition is satisfied comprises;

lane change determination means (S11, S12, S21, S22) for determining whether or not the own vehicle is changing a lane; and performing condition change means (S14) for changing the performing condition in such a manner that the rear-end pre-crash safety control is performed more easily in a case when it is determined that the own vehicle is changing a lane compared with a case when it is not determined that the own vehicle is changing a lane.

The vehicle control apparatus of the present disclosure comprises the rear-end pre-crash safety system. The rear-end pre-crash safety system performs the rear-end pre-crash safety control which is a control to detect the approaching vehicle approaching the own vehicle from rear, and to enhance safety against a collision of the approaching vehicle with the own vehicle when the predetermined performing condition is satisfied.

When the own vehicle changes a lane, it is considered that, after the lane change is started, another vehicle traveling on an adjacent lane which is to be a new lane for the own vehicle after the lane change rapidly approaches the own vehicle diagonally from rear. In such a case, there is a possibility that the rear-end pre-crash safety control may be delayed. Therefore, the present disclosure comprises the lane change determination means and the performing condition change means.

The lane change determination means determines whether or not the own vehicle is changing a lane. The performing condition change means changes the performing condition in such a manner that the rear-end pre-crash safety control is performed more easily in a case when it is determined that the own vehicle is changing a lane compared with a case when it is not determined that the own vehicle is changing a lane. As a result, according to the present disclosure, the rear-end pre-crash safety control can be performed at an early timing with improved safety.

One feature of another aspect of the present disclosure lies in that;

the vehicle control apparatus is applied to a vehicle comprising a lane change assist system (20, 30, 40, 50, 60) which performs a lane change assist control which is a control to change a lane on which the own vehicle travels by an automatic steering, and the lane change determination means is configured to;

obtain (s11) a lane change assist information showing that the lane change assist system is performing the lane change assist control, and determine (S12) whether or not the own vehicle is changing a lane based on the lane change assist information.

In another aspect of the present disclosure, the lane change assist system which performs the lane change assist control which is a control to change a lane on which the own vehicle travels by an automatic steering is applied to the vehicle. When the lane change assist control is performed, a steering operation by the driver becomes unnecessary. The lane change assist system monitors a periphery of the own vehicle, and performs the lane change assist control after confirming that there do not exist any obstacles such as other vehicles and the like which are to interfere with the lane change. In the lane change assist control, the own vehicle may be moved to the adjacent lane slowly by taking time in order to give a sense of security to the driver. However, there is a possibility that, after the lane change is started, another vehicle traveling on the adjacent lane which is to be a new lane for the own vehicle after the lane change rapidly approaches the own vehicle diagonally from rear.

Therefore, the lane change determination means obtains the lane change assist information showing that the lane change assist system is performing the lane change assist control, and determines whether or not the own vehicle is changing a lane based on the lane change assist information. When it is determined that the own vehicle is changing a lane based on the lane change assist information, the performing condition change means changes the performing condition in such a manner that the rear-end pre-crash safety control is performed more easily. Thereby, according to another aspect of the present disclosure, the rear-end pre crash safety control can be performed at an early timing with improved safety.

One feature of another aspect of the present disclosure lies in that;

the lane change determination means is configured to;

obtain (S21) a winker information showing an operating state of a winker, and determine (S22) whether or not the owe vehicle is changing a lane based on the winker information.

According to another aspect of the present disclosure, whether or not the own vehicle is changing a lane is determined based on the winker information showing the operating state of the winker. Therefore, it becomes possible to change the performing condition in such a manner that the rear-end pre-crash safety control is performed more easily also in a case when the driver changes a lane by his/her own operation of the steering wheel.

One feature of another aspect of the present disclosure lies in that;

the performing condition includes a target, vehicle condition that a target vehicle which is a vehicle subject to the rear-end pre-crash safety control is an approaching vehicle approaching the own vehicle from rear, traveling on a traveling locus of the own vehicle, and the performing condition change means is configured to change the target vehicle condition in a case when it is determined that the own vehicle is changing a lane in such a manner that the target vehicle includes an approaching vehicle approaching the own vehicle from rear without traveling on the traveling locus of the own vehicle.

In another aspect of the present disclosure, the performing condition includes the target vehicle condition that the target vehicle is an approaching vehicle approaching the own vehicle from rear, traveling on the traveling locus of the own vehicle. When it is determined that the own vehicle is changing a lane, the performing condition change means changes the target vehicle condition in such a manner that the target vehicle includes an approaching vehicle approaching the own vehicle from rear without traveling on the traveling locus of the own vehicle. Therefore, when the own vehicle is changing a lane, it becomes possible to regard another vehicle approaching the own vehicle, traveling on the adjacent lane which is to be a new lane for the own vehicle after the lane change as the target vehicle subject to the rear-end pre-crash safety control. Thereby, the rear-end pre-crash safety control can be performed at, an early timing with improved safety.

One feature of another aspect of the present disclosure lies in that;

the performing condition includes a brake condition that braking is being performed, and the performing condition change means is configured to exclude the brake condition in a case when it is determined that the own vehicle is changing a lane.

In another aspect of the present disclosure, the performing condition includes the brake condition that braking is being performed. The performing condition change means excludes the brake condition when it is determined that the own vehicle is changing a lane. Thereby, the rear-end pre-crash safety control can be performed more easily with improved safety.

One feature of another aspect of the present disclosure lies in that;

the performing condition includes a time to collision condition that a time to collision indicating an expected time for the approaching vehicle to collide with the own vehicle is less than or equal to a threshold value, and the performing condition change means is configured to switch the threshold value to a larger value in a case when it is determined that the own vehicle is changing a lane compared with a case when it is not determined that the own vehicle is changing a lane.

In another aspect of the present disclosure, the performing condition includes the time to collision condition that the time to collision indicating the expected time for the approaching vehicle to collide with the own vehicle is less than or equal to the threshold value. When it is determined that the own vehicle is changing a lane, the performing condition change means switches the threshold value to a larger value. Thereby, the rear-end pre-crash safety control can be performed at an early timing with improved safety.

One feature of another aspect of the present disclosure lies in that;

the rear-end pre-crash safety system is configured to perform at least one of an approach warning control to issue a warning to a driver of the approaching vehicle by blinking a hazard lamp, a headrest driving control to move a position of a headrest forward, and a seatbelt retracting control to retract a seatbelt.

In another aspect of the present disclosure, at least one of the approach warning control, the headrest driving control, and the seatbelt retracting control is performed as the rear-end pre-crash safety control. When the approach warning control is performed, the hazard lamp(s) blinks. Thereby, a warning can be issued to a driver of the approaching vehicle, making it possible to suppress the approaching vehicle from colliding with the own vehicle. Besides, when the headrest driving control is performed, the position of the headrest is moved forward. Thereby, it becomes possible to prepare for a collision by bringing the headrest into contact with a head of a passenger. Further, when the seatbelt retracting control is performed, the seatbelt is retracted. Thereby, the passenger can be securely restrained onto a seat.

In the above description, references used in the following descriptions regarding embodiments are added with parentheses to the elements of the present disclosure, in order to assist in understanding the present disclosure. However, those references should not be used to limit the scope of the disclosure.

DETAILED DESCRIPTION

A vehicle control apparatus according to an embodiment of the present disclosure will be described below, referring to figures.

Figure 1:
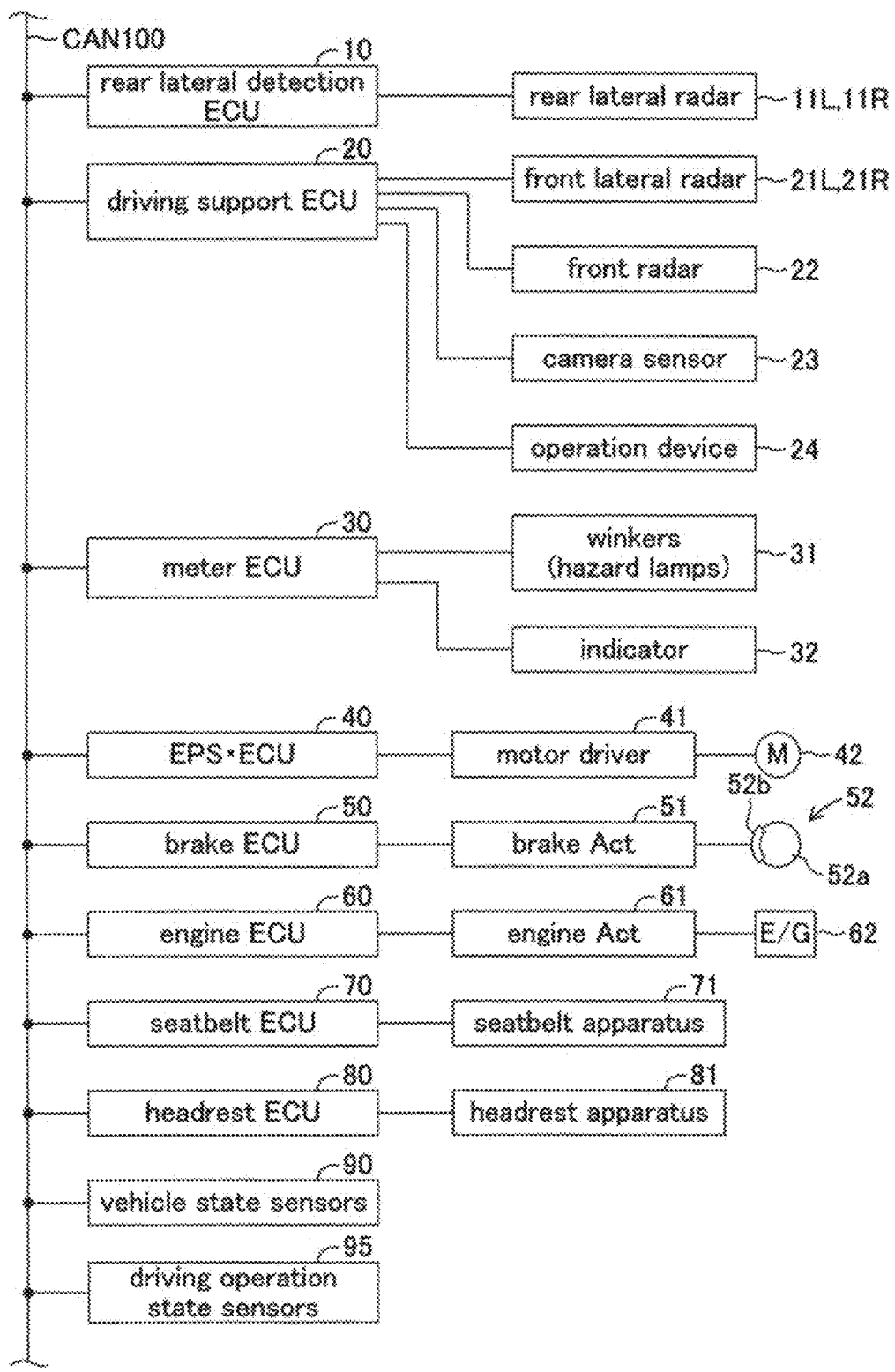
FIG. 1 is a schematic system configuration diagram of a vehicle control apparatus according to an embodiment of the present disclosure.

FIG. 1 shows a schematic system configuration diagram of the vehicle control apparatus according, to the embodiment of the present disclosure. The vehicle control apparatus is applied to a vehicle (hereinafter, may be referred to as an "own vehicle" in order to distinguish it from other vehicles). The vehicle control apparatus comprises a rear lateral detection ECU 10, a driving support ECU 20, a meter ECU 30, an electric power steering ECU 40, a brake ECU 50, an engine ECU 60, a seatbelt ECU 70, and a headrest ECU 80. Hereinafter, the rear lateral detection ECU 10 will be referred to as a "RLDECU 10", and the driving support ECU 20 will be referred to as a "DSECU 20".

Each of the ECUs is an electric control unit comprising a microcomputer as a main part. Those ECUs are connected via CAN (Controller Area Network) 100 so that the ECUs are capable of mutually transmitting and receiving information. In the present specification, the microcomputer includes CPU, ROM, RAM, a non-volatile memory, an interface I/F, or the like. The CPU is configured to realize/perform various functions by executing instructions (i.e., programs or routines) stored in the ROM. Some of those ECUs or all of those ECUs may be integrated into one ECU.

Besides, a plurality kinds of vehicle state sensors 90 for detecting states of the vehicle and a plurality kinds of driving operation state sensors 95 for detecting driving operation states of the driver are connected to the CAN 100. The vehicle state sensors 90 include, for example, a vehicle speed sensor for detecting a traveling speed of the vehicle, a steered wheel speed sensor for detecting a steered wheel speed, a front-rear G sensor for detecting an acceleration of the vehicle in a front-rear direction, a lateral G sensor for detecting an acceleration of the vehicle in a lateral direction, a yaw rate sensor for detecting a yaw rate of the vehicle, and the like.

The driving operation state sensors 95 include, for example, an acceleration operation amount sensor for detecting an operation amount of an accelerator pedal, a brake operation amount sensor for detecting an operation amount of a brake pedal, a brake switch for detecting whether or not a brake pedal is operated, a steering angle sensor for detecting a steering angle, a steering torque sensor for detecting a steering torque, a winker operation sensor for detecting an operation of a winker lever, a shift position sensor for detecting a shift position of a gear, and the like.

Information detected by the vehicle state sensors 90 and the driving operation state sensors 95 (referred to as a "sensor information") is transmitted to the CAN 100. Each of the ECUs can use the sensor information transmitted to the CAN 100. It should be noted that the sensor information is information of sensors connected to a specific ECU and there is a case that the sensor information is transmitted to the CAN 100 from that specific ECU.

Figure 2:
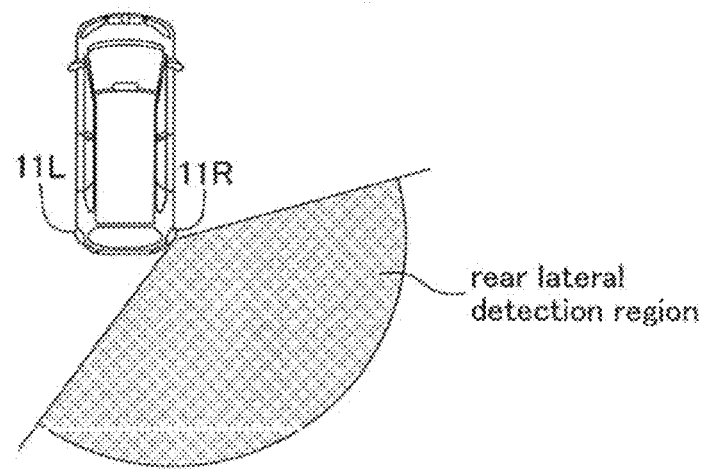
FIG. 2 is a plan view showing a detection angle of a rear lateral radar.

The RLDECU 10 is a control apparatus which is a core of the rear-end pre-crash safety control. As shown in FIG. 2, the RLDECU 10 is connected to a left rear lateral radar 11L and a right rear lateral radar 11R which are provided at left and right corners of a rear bumper. Although the left rear lateral radar 11L has a different detection region from the right rear lateral radar 11R, both have same configurations with each other. Hereinafter, when there is no need to distinguish the left rear lateral radar 11L from the right rear lateral radar 11R, both radars are combined to be called a rear lateral radar 11.

This rear lateral radar 11 comprises a radar transmission/reception part and a signal processing part (illustration omitted). The radar transmission/reception part emits an electric wave in a millimeter waveband (hereinafter, referred to as a "millimeter wave"), and receives a millimeter wave (i.e., a reflected wave) reflected from a three-dimensional object which is present in the emitted area (for example, another vehicle, a pedestrian, a bicycle, a building, and the like). The signal processing part detects the three-dimensional object based on a phase difference between the transmitted millimeter wave and the received reflected wave, an attenuation level of the reflected wave, a time from a point in time of transmitting the millimeter wave to a point in time of receiving the reflected wave, or the like.

As shown in FIG. 2, a detection region of the three-dimensional object of the right rear lateral radar 11R is a region expanding with respect to a central axis by a predetermined angle toward both left and right directions, the central axis extending from a right rear corner, part of a vehicle body to a right rear diagonal direction. A detection region of the three-dimensional object of the left rear lateral radar 11L is a region expanding with respect to a central axis by a predetermined angle toward both left and right directions, the central axis extending from a left rear corner part of the vehicle body to a left rear diagonal direction. Note that although only the detection region of the right rear lateral radar 11R is shown in FIG. 2, the detection region of the left rear lateral radar 11L is a region corresponding to a laterally inverted detection region of the right rear lateral radar 11R with respect to a vehicle front-rear axis. The detection region of the right rear lateral radar 11R and the detection, region of the left rear lateral radar 11L overlap with each other at the rear side of the vehicle. Therefore, a three-dimensional object positioned at the rear side of the vehicle is detectable by both of the left and right rear lateral radar 11. FIG. 2 shows a region of a detection angle of the rear lateral radar 11. A detection distance of the rear lateral radar 11 is several dozens of meters, for example.

The rear lateral radar 11 provides the RLDECU 10 with information regarding the detected three-dimensional object, for example, information including a distance between the own vehicle and the three-dimensional object, a relative speed between the own vehicle and the three-dimensional object a relative position of the three-dimensional object with respect to the own vehicle, and the like (hereinafter, referred to as a rear lateral information) every time a predetermined short interval elapses.

A main purpose of the RLDECU 10 is to perform the rear-end pre-crash safety control which is a control to detect another vehicle approaching the own vehicle from rear and to enhance safety against a collision of this approaching vehicle with the own vehicle. Therefore, hereinafter, the three-dimensional object will be referred to as another vehicle (other vehicles).

For example, the RLDECU 10 regards a vehicle approaching the own vehicle from rear, traveling on a traveling locus of the own vehicle as a target vehicle. The RLDECU 10 performs the rear-end pre-crash safety control in a case when the target vehicle is detected based on the rear lateral information provided from the rear lateral radar 11 and the predetermined condition is satisfied. The rear-end pre-crash safety control will be described later. Hereinafter, the rear-end pre-crash safety control will be referred to as a rear PCS control.

Besides, the RLDECU 10 provides the rear lateral information to the DSECU 20 via CAN 100. The DSECU 20 performs a lane change assist control as will be described later. When performing the lane change assist control, the DSECU 20 determines whether or not a control start permission condition is satisfied by grasping a presence of the other vehicle traveling on an adjacent lane which is to be a new lane for the own vehicle after finishing the lane change. In this case, the DSECU 20 uses the rear lateral information provided from the RLDECU 10 for detecting the other vehicle traveling on the adjacent lane at a rear lateral side of the own vehicle.

In addition, the RLDECU 10 performs, in addition to the rear PCS control, a blind spot monitor (BSM) control which is a control to alarm the driver of the own vehicle by blinking a non-illustrated indicator in a case when there exists another vehicle in blind spots where an object is not reflected in left and right side mirrors. For example, the blind spots relative to the own vehicle are stored in the RLDECU 10 in advance, and the RLDECU 10 determines, based on the rear lateral information, whether or not there exists another vehicle in the blind spots and whether or not there exists another vehicle expected to enter the blind spots within a set time, and makes the indicator blink when making an "Yes" determination in at least one of the above determinations. For example, each of the indicators is provided on a part of a region of each of the left and right side mirrors. The RLDECU 10 blinks the indicator corresponding to the blind spot positioned at a side where the other vehicle is determined to exist, thereby making it possible to notify the driver of the existence of the other vehicle which is not reflected on the side mirrors.

Next, a description about the DSECU 20 will be made. The DSECU 20 is a control apparatus which is a core of a driving support system for supporting driving operations of the driver. The DSECU 20 is connected to a left front lateral radar 21L, a right front lateral radar 12R, a front radar 22, a camera sensor 23, and an operation device 24.

Figure 3:
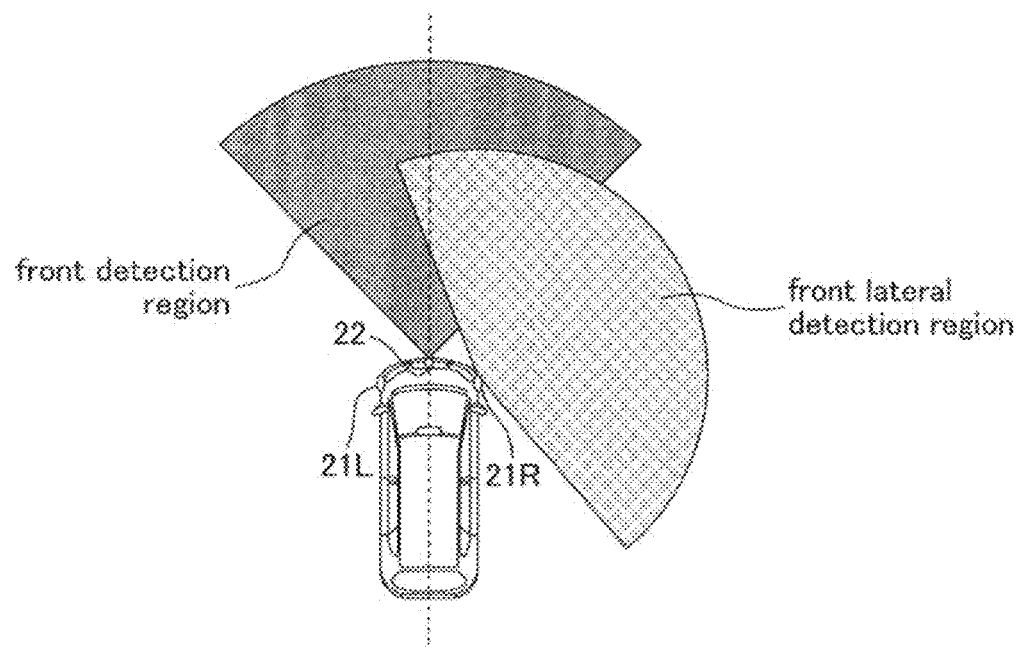
FIG. 3 is a plan view showing detection angles of a front lateral radar and a front radar.

As shown in FIG. 3, the left front lateral radar 21L is provided at a left corner part of a front bumper and the right front lateral radar 21R is provided at a right corner part of the front bumper. Besides, the front radar 22 is provided at a central position of the front bumper in a vehicle width direction. Although the left front lateral radar 21L, the right front lateral radar 21R, and the front radar 22 have different detection regions, they all basically have same configurations with each other. Hereinafter, when there is no need to distinguish the left front lateral radar 21L from the right front lateral radar 21R, both radars are combined to be called a front lateral radar 21.

Each of the front lateral radar 21 and the front radar 22 comprises a radar transmission/reception part and a signal processing part (illustration omitted). The radar transmission/reception part emits a millimeter wave, and receives the millimeter wave (i.e., a reflected wave) reflected from a three-dimensional object which is present in the emitted area (for example, another vehicle, a pedestrian, a bicycle, a building, and the like). The signal processing part detects the three-dimensional object based on a phase difference between the transmitted millimeter wave and the received reflected wave, an attenuation level of the reflected wave, a time from a point in time of transmitting the millimeter wave to a point in time of receiving the reflected wave, or the like.

As shown in FIG. 3, a detection region of the three-dimensional object of the front radar 22 is a front region symmetrically expanding with respect to the vehicle front-rear axis by a predetermined angle. Besides, a detection region of the three-dimensional object of the right front lateral radar 21R is a region expanding with respect to a central axis by a predetermined angle toward both left and right directions, the central axis extending from a right front corner part of the vehicle body to a right front diagonal direction. A detection region of the three-dimensional object of the left front lateral radar 21L is a region expanding with respect to a central axis by a predetermined angle toward both left and right directions, the central axis extending from a left front corner part of the vehicle body to a left front diagonal direction. Note that although only the detection region of the right front lateral radar 21R is shown in FIG. 3, the detection region of the left front lateral radar 21L is a region corresponding to a laterally inverted detection region of the right front lateral radar 21R with respect to the vehicle front-rear axis. FIG. 3 shows regions of detection angles of the front lateral radar 21 and the front radar 22. Each of detection distances of the front lateral radar 21 and the front radar 22 is several dozens of meters, for example.

The front lateral radar 21 and the front radar 22 provide the DSECU 20 with information regarding the detected three-dimensional object, for example, information including a distance between the own vehicle and the three-dimensional object, a relative speed between the own vehicle and the three-dimensional object, a relative position of the three-dimensional object with respect to the own vehicle, and the like (hereinafter, referred to as a front lateral information) every time a predetermined short interval elapses. Besides, as mentioned earlier, the DSECU 20 obtains the rear lateral information as well. Hereinafter, the front lateral information and the rear lateral information are combined to be called as a vehicle peripheral information.

The camera sensor 23 comprises a non-illustrated camera and an image processing part. The camera photographs a scenery in front of the own vehicle to obtain an image data. The image processing part recognizes left and right white lines (lane markers) formed on a road based on the image data obtained by the camera photographing, and provides the DSECU 20 with information regarding the recognized white lines.

Figure 4:
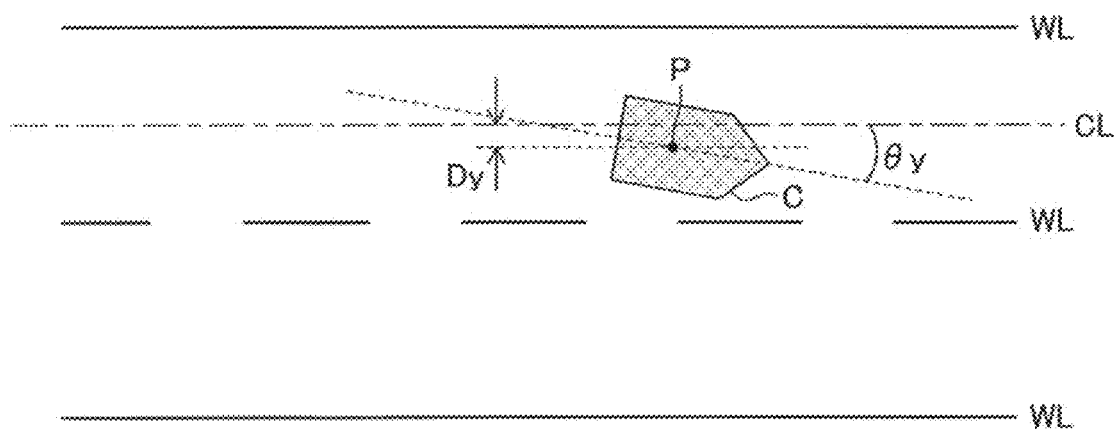
FIG. 4 is a plan view for describing a lane related vehicle information.

As shown in FIG. 4, the DSECU 20 sets, based on the information provided by the camera sensor 23, a lane center line CL which is a central position in a width direction of the left and right white lines WL of the lane on which the own vehicle is traveling. This lane center line CL is used as a target traveling line in a lane trace assist control which will be described later. Besides, the DSECU20 calculates a curvature Cu of a curve of the lane center line CL.

In addition, the DSECU 20 calculates a position and a direction of the own vehicle on the lane defined by the left and right white lines WL. For example, as shown in FIG. 4, the DSECU 20 calculates a distance Dy between a reference point P (for example, a point of a center of gravity) of the own vehicle C and the lane center line CL in a road width direction, that is, a distance Dy by which the own vehicle C is deviated from the lane center line CL in the road width direction. Hereinafter, the distance Dy is referred to as a lateral deviation. Dy. Besides, the DSECU 20 calculates an angle θy formed by a direction of the lane center line CL and a direction in which the own vehicle C is oriented, that is, an angle θy by which the direction in which the own vehicle C is oriented is deviated from the direction of the lane center line CL in a horizontal direction (on a horizontal plane). Hereinafter, the angle θy is referred to as a yaw angle θy. Besides, information (Cu, Dy, θy) showing the curvature Cu, the lateral deviation Dy, and the yaw angle θy is referred to as a lane related vehicle information.

Further, the camera sensor 23 provides the DSECU 20 with information regarding white lines of not only the lane of the own vehicle but also the adjacent lane, the information including a type of a white line detected (a solid line, a broken line), a distance between adjacent left and right white lines (a width of a lane), a shape of a white line, and the like. When the white line is a solid line, it is prohibited for the own vehicle to change a lane by striding over that white line. On the other hand, when the white line is a broken line (a white line formed intermittently at a constant interval), it is permitted for the own vehicle to change a lane by striding over that white line. The lane related vehicle information (Cu, Dy, θy) and the information regarding white lines are combined to be called a lane information.

It should be noted that in the present embodiment, the DSECU 20 calculates the lane related vehicle information (Cu, Dy, θy). However, a configuration where the camera sensor 23 calculates the lane related vehicle information (Cu, Dy, θy) instead to provide the DSECU 20 with the calculation result may be adopted.

The DSECU 20 performs the lane change assist control, the lane trace assist control, and the trailing inter-vehicle gap control based on the following information such as the front lateral information provided from the front lateral radar 21 and the front radar 22, the rear lateral information provided from the RLDECU 10, the lane information obtained based on a white line recognition by the camera sensor 23, the vehicle state detected by the vehicle state sensor 90, the driving operation states detected by the driving operation state sensor 95, and the like.

The operation device 24 operated by the driver is connected to the driving support ECU 20. The operation device 24 is a device for performing settings regarding whether or not to perform each of the lane change assist control, the lane trace assist control, and the trailing inter-vehicle gap control, and so on. The DSECU 20 inputs an operating signal of the operation device 24 to determine whether or not to perform each of the controls. In this case, when a performance of the trailing inter-vehicle gap control has not been selected, the lane change assist control and the lane trace assist control are also automatically set not to be performed. Besides, when a performance of the lane trace assist control has not been selected, the lane change assist control is also automatically set not to be performed.

The meter ECU 30 is connected to left and right winkers 31 and an indicator 32. Each of the winkers 31 is also referred to as a turn lamp, Besides, although the winkers 31 are lamps functioning as direction indicators, the winkers 31 are also used as hazard lamps by the left and right winkers 31 blinking at a same time. Hereinafter, when used as the hazard lamps, the winkers 31 are referred to as the hazard lamps 31.

The meter ECU 30 comprises a winker driving circuit (illustration omitted). When the meter ECU 30 receives a winker blinking instruction via the CAN 100, the meter ECU 30 blinks one of the winkers 31 corresponding to a direction/ side (right or left) designated by the winker blinking instruction. When the meter ECU 30 receives a hazard lamps blinking instruction, the meter ECU 30 blinks the left and right winkers 31 (that is, the hazard lamps 31) at the same time.

Besides, the meter ECU 30 inputs a detection signal of a winker operation sensor for detecting an operation of a winker lever, and in response to the operation of the winker lever, blinks one of the winkers 31 corresponding to an operating direction. While the meter ECU 30 is blinking one of the winkers 31, the meter ECU 30 transmits to the CAN 100 a winker monitor signal showing that one of the winkers 31 is in a blinking state.

Further, when the meter ECU 30 receives an indicating instruction via the CAN 100, the meter ECU 30 indicates on the indicator 32 an indication picture designated by the indicating instruction. For example, the meter ECU 30 indicates on the indicator 32 a notification picture regarding the rear PCS control or a notification picture regarding driving support controls (ACC, LTA, LCA) which will be described later.

The electric power steering ECU 40 is a control apparatus of an electric power steering apparatus. Hereinafter, the electric power steering ECU 40 is referred to as an EPS•ECU (Electric Power Steering ECU) 40. The EPS•ECU 40 is connected to a motor driver 41. The motor driver 41 is connected to a steering motor 42. The steering motor 42 is incorporated into a non-illustrated steering mechanism.

The EPS•ECU 40 detects a steering torque which the driver input to a steering wheel (illustration omitted) by using a steering torque sensor arranged at a steering shaft. The EPS•ECU 40 controls an electric conduction of the motor driver 41 based on the detected steering torque and drives the steering motor 42. A steering torque is applied to the steering mechanism by driving the steering motor 42, assisting a steering operation of the driver.

Besides, when the EPS•ECU 40 receives a steering instruction from the DSECU 20 via the CAN 100, the EPS•ECU 40 drives the steering motor 42 with a control, amount specified by the steering instruction to generate a steering torque. This steering torque is different from the steering assist torque applied in order to lighten the aforementioned steering operation (a steering wheel operation) by the driver, and is applied to the steering mechanism by the steering instruction from the DSECU 20 without the steering operation by the driver.

The brake ECU 50 is connected to a brake actuator 51. The brake actuator 51 is provided in a hydraulic circuit between a non-illustrated master cylinder to compress operating fluid with a depression force of the brake pedal and friction brake mechanisms 52 provided at left-and-right-front wheels and left-and-right-rear wheels. Each of the friction brake mechanisms 52 comprises a brake disc 52a fixed to the wheel and a brake caliper 52b fixed to the vehicle body. The brake actuator 51 adjusts, in response to an instruction from the brake ECU 50, an hydraulic pressure that is supplied to a wheel cylinder which is built in the brake caliper 52, and operates the wheel cylinder with the hydraulic pressure. Thereby, the brake actuator 51 presses a brake pad onto the brake disc 52a to generate a friction braking force. Accordingly, the brake ECU 50 can control the braking force of the own vehicle by controlling the brake actuator 51.

The engine ECU 60 is connected to an engine actuator 61. The engine actuator 61 is an actuator for changing a driving state of an internal combustion engine 62, and includes a throttle valve actuator to change an opening degree of the throttle valve. The engine ECU 60 can change torque which the internal combustion engine 62 generates by driving the engine actuator 61. Therefore, the engine ECU 60 can control the engine actuator 61 to control a driving force of the own vehicle, so as to change an acceleration state (an acceleration rate).

The seatbelt ECU 70 is connected to a seatbelt apparatus 71. The seatbelt apparatus 71 comprises a motor for retracting a seatbelt (webbing). When the seatbelt apparatus 71 receives a seatbelt retracting instruction via the CAN 100, the seatbelt apparatus 71 supplies electricity to the motor to retract the seatbelt. Thereby, a passenger can be securely restrained onto a seat. It should be noted that as a seatbelt apparatus for retracting a seatbelt by a motor, well-known apparatuses as proposed in Japanese Patent Application Laid-Open (kokai) No. 2007-186054, No. 2004-34887, and the like can be adopted.

The headrest ECU 80 is connected to a headrest apparatus 81. The headrest apparatus 81 comprises a motor to change a position of a headrest in a front-rear direction and a head position detection sensor (for example, a capacitive sensor) to detect a distance between the headrest and a head of the passenger. The headrest is positioned on top of the seat and is set at a height corresponding to a height of a back of the head of the passenger, supporting the passenger's head from behind. The headrest is movable in the front-rear direction of the vehicle, and the position thereof in the front-rear direction is adjustable by the motor.

When the headrest ECU 80 receives a headrest driving instruction via the CAN 100, the headrest ECU 80 drives the motor based on a detection signal of the head position detection sensor to move the headrest to an optimal front-rear position. In this case, the headrest ECU 80 drives the motor to move the headrest forward in such a manner that a magnitude of a capacitance detected by the head position detection sensor becomes a target value corresponding to a position immediately before the headrest makes contact with the head of the passenger. It should be noted that as a headrest apparatus for adjusting a front-rear position of a headrest, well-known apparatuses as proposed in Japanese Patent Application Laid-Open (kokai) No. 2008-120228 and the like can be adopted.

<Rear PCS Control>

The RLDECU 10 regards a vehicle approaching the own vehicle from rear, traveling on a traveling locus of the own vehicle as a target vehicle, and performs the rear PCS control when a possibility that the target vehicle collides with the own vehicle becomes high. In the present embodiment, following three controls are performed as the rear PCS control, that is, a control to blink the hazard lamps 31 (an approach warning control), a control to retract the seatbelt, and a control to move the position of the headrest forward. Hereinafter, the approach warning control to blink the hazard lamps 31 is referred to as an FHL (Flashing Hazard Lights) control, and the control to retract the seatbelt is referred to as a seatbelt retracting control, and the control to move the position of the headrest forward is referred to as a headrest driving control.

Figure 5:
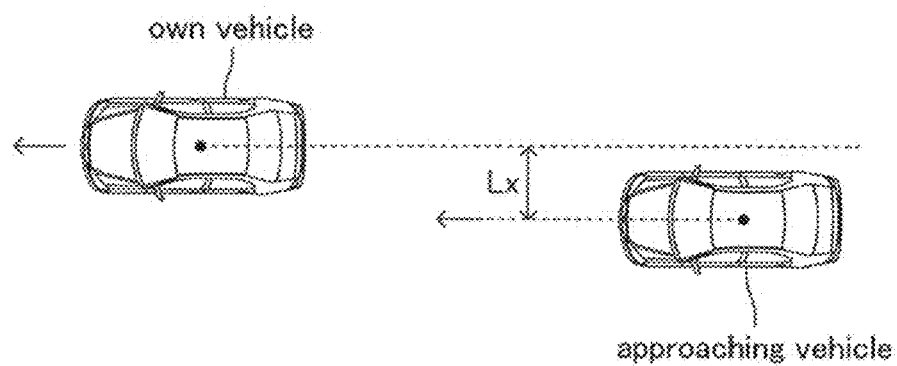
FIG. 5 is a plan view for describing a target vehicle.

In either of the rear PCS control, a vehicle approaching the own vehicle from rear, traveling on the traveling locus of the own vehicle is regarded as a target vehicle. For example, as shown in FIG. 5, assuming that a deviation amount of an approaching vehicle with respect to the traveling locus of the own vehicle in the vehicle width direction is defined as Lx, an approaching vehicle traveling in a region where the deviation amount Lx is less than or equal to a predetermined threshold value Lxref is regarded as a target vehicle.

The RLDECU 10 obtains vehicle state information such as a vehicle speed, a steering angle, and a yaw rate. The RLDECU 10 calculates a traveling locus of the own vehicle based on these vehicle state information, and stores the traveling locus of the own vehicle within a most recent predetermined time or within a most recent predetermined traveling distance region. The RLDECU 10 sets an approaching vehicle traveling in a region where the deviation amount Lx is less than or equal to the threshold value Lxref with respect to this stored most recent traveling locus of the own vehicle as a target vehicle for the rear PCS control.

The RLDECU 10 obtains the rear lateral information detected by the rear lateral radar 11 to determine whether or not there exists the aforementioned target vehicle. Thereafter, when there exists the target vehicle, the RLDECU 10 calculates a time to collision (TTC) which is a time expected to require for the target vehicle to collide with the own vehicle from a current time based on a relative speed Vr of the target vehicle with respect to the own vehicle and a distance Dr between the own vehicle and the target vehicle. For example, the time to collision (TTC) is calculated in accordance with Dr/Vr. It should be noted that the time to collision (TTC) may be calculated by taking, for example, an acceleration or deceleration of the target vehicle with respect to the own vehicle into account.

The RLDECU 10 performs the rear PCS control when the possibility that the other vehicle collides with the own vehicle becomes high based on the time to collision (TIC) of the target vehicle approaching from rear. In the present embodiment, following three conditions are set as necessary conditions for the rear PCS control to be performed, that is, as performing conditions.

1. Regard a vehicle approaching from rear, traveling on a traveling locus of the own vehicle as a target vehicle (A target vehicle condition).

2. Braking is being performed when traveling at more than or equal to a predetermined vehicle speed (A brake condition).

3. Time to collision (TTC) is less than a threshold value (A TTC condition).

When the aforementioned conditions 1, 2, 3 are all satisfied, the RLDECU 10 determines that the performing conditions of the rear PCS control are satisfied.

The performing condition 2 (the brake condition) requires that braking is being performed in a case when a vehicle speed detected by the vehicle speed sensor is more than or equal to a predetermined vehicle speed (10 km/h, for example), and does not require that braking is being performed in a case when the vehicle speed is less than the predetermined vehicle speed. A determination of whether or not braking is being performed can be performed based on a brake operating signal transmitted from the brake ECU 50 or a signal of a brake switch. It should be noted that in the present embodiment, the brake condition includes a speed condition. However, the brake condition does not necessarily include the speed condition.

Besides, in the performing condition 3 (the TTC condition), different threshold values are used depending on the FHL control, the seatbelt retracting control, and the headrest driving control. Therefore, three different rear PCS controls are not started simultaneously, but are started independently at a timing when each TTC condition is satisfied. It should be noted that the threshold value of each TTC condition may vary depending on, for example, the deviation amount Lx. For example, the threshold value may become larger as the deviation amount Lx becomes smaller.

When the performing conditions of the FHL control are satisfied, the RLDECU 10 transmits the hazard lamps blinking instruction to the meter ECU 30. Thereby, a warning can be sounded to a driver of the approaching vehicle, resulting in having the driver recognize a presence of the own vehicle to reduce a possibility of the collision.

Besides, when the performing conditions of the seatbelt retracting control are satisfied, the RLDECU 10 transmits a seatbelt retracting instruction to the seatbelt ECU 70. Thereby, a tension of the seatbelt is increased, enabling the passenger to be securely restrained onto the seat.

Further, when the performing conditions of the headrest driving control are satisfied, the RLDECU 10 transmits a headrest driving instruction to the headrest ECU 80. Thereby, the headrest is moved to the position where the headrest makes contact with the head of the passenger, and as a result, it is suppressed that the passenger has a whiplash injury even when the approaching vehicle collides with the own vehicle from rear.

A rear-end pre-crash safety system of the present disclosure comprises the RLDECU 10, the meter ECU 30, the seatbelt ECU 70, the headrest ECU 80, and sensors and actuators connected to those ECUs.

Next, a description regarding the lane change assist control performed by the DSECU 20 will be made. The DSECU 20 performs the lane change assist control when the DSECU 20 receives a lane change assist request in a situation where both of the lane trace assist control and the trailing inter-vehicle gap control are being performed. Therefore, descriptions regarding the lane trace assist control and the trailing inter-vehicle gap control will be made first. Hereinafter, the lane change assist control is referred to as a LCA, the lane trace assist control is referred to as a LTA, and the trailing inter-vehicle gap control is referred to as an ACC (an Adaptive Cruise Control).

<LTA>

The LTA is a control to assist the steering operation of the driver by applying a steering torque to the steering mechanism so that a position of the own vehicle is kept in a vicinity of the target traveling line. In the present embodiment, the target traveling line is the lane center line CL. However, a line offset from the lane center line CL by a predetermined distance in the road width direction may be adopted as the target traveling line.

The DSECU 20 performs the LTA when the LTA is being requested by an operation of the operation device 24. When the LTA is being requested, the DSECU 20 calculates a target steering angle θlta* in accordance with a following formula (1) based on the aforementioned lane related vehicle information (Cu, Dy, θy) every time a predetermined calculation interval elapses.

$$\theta lta^* = Klta1 \cdot Cu + Klta2 \cdot \theta y + Klta3 \cdot Dy + Klta4 \cdot \Sigma Dy \quad (1)$$

Here, Klta1, Klta2, Klta3, Klta4 are control gains. A first term of a right side in the formula (1) is a steering angle component on a feed-forward basis determined depending on the road curvature Cu. A second term of the right side in the formula (1) is a steering angle component to decrease the yaw angle θy (that is, to decrease a deviation of an own vehicle direction from the lane center line CL) on a feedback basis. A third term of the right side in the formula, (1) is a steering angle component to decrease the lateral deviation Dy which is a positional deviation of the own vehicle from the lane center line CL in the road width direction on a feedback basis. A fourth term of the right side in the formula (1) is a steering angle component to decrease an integrated value ΣDy of the lateral deviation Dy on a feedback basis.

For example, a target steering angle θlta* in the left direction is set when the lane center line CL is curved in the left direction, when the own vehicle is laterally deviated in the right direction from the lane center line CL, and when the own vehicle is oriented in the right direction with respect to the lane center line CL. In addition, a target steering angle θlta* in the right direction is set when the lane center line CL is curved in the right direction, when the own vehicle is laterally deviated in the left direction from the lane center line CL, and when the own vehicle is oriented in the left direction with respect to the lane center line CL. Therefore, in calculating the above formula (1), an appropriate sign depending on the left or right direction may be used.

The DSECU 20 outputs to the EPS·ECU 40 an instruction signal indicating the target steering angle θlta* which is a calculation result. The EPS-ECU 40 controls driving of the steering motor 42 so that the steering angle follows the target steering angle θlta*. It should be noted that in the present embodiment, the DSECU 20 outputs to the EPS•ECU 40 the instruction signal indicating the target steering angle θlta*. However, the DSECU 20 may calculate a target torque used to obtain the target steering angle θlta*, and output to the EPS•ECU 40 an instruction signal indicating the target torque which is a calculation result, instead.

<ACC>

The ACC performs following controls based on the vehicle peripheral information. That is, in a case when there exists a preceding vehicle traveling right ahead the own vehicle, the ACC makes the own vehicle trail the preceding vehicle, maintaining an inter-vehicle distance between the preceding vehicle and the own vehicle at a predetermined distance, and in a case when there does not exist such a preceding vehicle, the ACC makes the own vehicle travel at a constant speed set in advance.

When the ACC is being requested by an operation of the operation device 24, the DSECU 20 performs the ACC. When the ACC is being requested, the DSECU 20 selects a trailing target vehicle based on the front lateral information provided from the front lateral radar 21 and the front radar 22. For example, the DSECU 20 determines whether or not there exists another vehicle within a predetermined trailing target vehicle area.

When the other vehicle has been present within the trailing target vehicle area over more than or equal to a predetermined time, the DSECU 20 selects this other vehicle as a trailing target vehicle, and set a target acceleration in such a manner that the own vehicle trails the trailing target vehicle. On the other hand, when the other vehicle is not present within the trailing target vehicle area, the DSECU 20 sets a target acceleration based on the set vehicle speed and the detected vehicle speed (the vehicle speed detected by the vehicle speed sensor) in such a manner that the vehicle speed of the own vehicle coincides with the set vehicle speed.

The DSECU 20 controls the engine actuator 61 using the engine ECU 60, and when necessary, controls the brake actuator 51 using the brake ECU 50 so that the acceleration of the own vehicle coincides with the target acceleration.

<LCA>

The LCA is a control to assist the steering operation (the lane change operation) of the driver by applying a steering torque to the steering mechanism so that the own vehicle moves to an adjacent lane from a lane on which the own vehicle is currently traveling while monitoring a periphery of the own vehicle after being determined that a safe lane change is possible as a result of monitoring the periphery of the own vehicle. Therefore, the LCA makes it possible to change a lane on which the own vehicle travels without a need of the steering operation (the steering wheel operation) of the driver.

As is the case with the LTA, the LCA is a control of a lateral position of the own vehicle with respect to a lane, and is performed in place of the LTA in a case when the lane change assist request is accepted while the LTA and the ACC are being performed.

When performing the LCA, the DSECU 20 calculates a target locus of the own vehicle based on the current lane information provided from the camera sensor 23 and the vehicle state of the own vehicle. The target locus is a locus on which the own vehicle moves, based on a target-time-to-change-the-lane, from a lane on which the own vehicle is currently traveling (referred to as an original lane) to a central position (referred to as a final target lateral position) in the width direction of a lane (referred to as a target lane) adjacent to the original lane and is positioned in a direction of the lane change assist request, taking the target-time-to-change-the-lane. The target locus has a shape shown in FIG. 6, for example. The target locus is expressed, based on a lane center line CL (refer to FIG. 4) of the original lane, using a target lateral position of the own vehicle corresponding to an elapsed time from a timing, when the LCA is started.

The DSECU 20 has been performing the LTA before starting the LCA. In the LTA, a target steering angle is calculated in the aforementioned manner, and a steering torque is generated so that this target steering angle can be obtained. As is the case with the LTA, in the LCA as well, the DSECU 20 calculates a target steering angle and generate a steering torque so that the target steering angle can be obtained.

The target steering angle in the LCA can be calculated by changing target values of a curvature, a yaw angle, and a lateral deviation in the formula of a target steering angle in the LTA. That is, in the LTA the target value of the curvature is set to be a curvature of the traveling lane of the own vehicle, and the target values of the yaw angle and the lateral deviation are set to zero, whereas in the LCA, a target curvature $Cu^*$, a target yaw angle $\theta y^*$, and a target lateral deviation $Dy^*$ are determined based on a shape of the target locus.

The DSECU 20 calculates the target steering angle $\theta lca^*$ as a control amount of the LCA in accordance with a following formula (2) every time the predetermined calculation interval elapses.

$$\theta lca^* = Klca1 \cdot Cu^* Klca2 \cdot (\theta y^* - \theta y) + Klca3 \cdot (Dy^* - Dy) + Klca4 \cdot \Sigma(Dy^* - Dy) \quad (2)$$

Here, for $\theta y$ and $Dy$ in the formula (2), the values according to the lane related vehicle information ($Cu$, $Dy$, $\theta y$) at a current timing (at a timing of calculation) are used. Klca1, Klca2, Klca3, Klca4 are control gains.

A first term of a right side in the formula (2) is a steering angle component on a feed-forward basis determined depending on the target curvature $Cu^*$ determined based on the shape of the target locus. A second term of the right side in the formula (2) is a steering angle component to decrease, a deviation of the actual yaw angle $\theta y$ from the target yaw angle $\theta y^*$ determined based on the shape of the target locus on a feedback basis. A third term of the right side in the formula (2) is a steering angle component to decrease a deviation of the actual lateral deviation $Dy$ from the target lateral deviation $Dy^*$ determined based on the shape of the target locus on a feedback basis. A fourth term of the right side in the formula (2) is a steering angle component to decrease an integrated value $\Sigma(Dy^* - Dy)$ of a deviation of the actual lateral deviation $Dy$ from the target lateral deviation $Dy^*$ on a feedback basis. In this way, a transition from the LTA to the LCA can be made smoothly by calculating the target steering angle $\theta lca^*$ as a control amount of the LCA.

The DSECU 20 transmits a steering instruction indicating a target steering angle $\theta lca^*$ to the EPS•ECU 40 every time the DSECU 20 calculates the target steering angle $\theta lca^*$. Thereby, the own vehicle travels along the target locus, and the lane change is performed.

The DSECU 20 determines whether or not an LCA-start-permission-condition is satisfied when receiving the LCA requesting signal by an operation of a lane change assist request operation device (illustration omitted) while performing the LTA. When the LCA-start-permission-condition is satisfied, the DSECU 20 starts the LCA. For the lane change assist request operation device, the operation device 24 or a dedicated operation device may be used. Further, a configuration where the LCA requesting signal is transmitted to the DSECU 20 when a predetermined, usually-not-operated operation of the winker lever is performed (for example, when an operation that the winker lever is pushed shallowly by a predetermined small angle is kept for a predetermined time, and the like) may be adopted. The lane change assist request operation device transmits the LCA requesting signal including information indicating a direction of the lane change (right or left).

The LCA-start-permission-condition includes at least following two conditions.

1. A white line (a white line positioned between the original lane and the target lane) in the LCA requested direction is a broken line.

2. Any obstacles (other vehicles and the like) which may interfere with the lane change are not detected by a periphery sensor (the front lateral radar 21, the front radar 22, the rear lateral radar 11, the camera sensor 23), and it is determined that a safe lane change is possible.

The DSECU 20 determines that the LCA-start-permission-condition is satisfied when the above permission conditions 1 and 2 are both satisfied.

For example, regarding the permission condition 2, the DSECU 20 detects any other vehicles (a vehicle traveling ahead of the own vehicle, a vehicle traveling side-by-side, with the own vehicle, and a vehicle traveling at a rear side of the own vehicle) traveling on the target lane which is the adjacent lane (that is, the new lane for the own vehicle after the lane change). Thereafter, the DSECU 20 calculates, for each of the detected other vehicles, a time to collision (TTC) in a case when the own vehicle changed the lane to the target lane based on, a relative speed thereof with respect to the own vehicle and the information showing a distance with the own vehicle. The DSECU 20 determines that the permission condition 2 is satisfied when the time to collision (TTC) is greater than an LCA start permission threshold value.

When the LCA-start-permission-condition is satisfied, the DSECU 20 starts calculating the target steering angle θlca*, and transmits to the EPS ECU 40 the steering instruction indicating the calculated target steering angle θlca*. Thereby, the own vehicle travels along with the target locus, and the lane change is performed.

Once the LCA is started, the DSECU 20 determines whether or not an LCA finishing condition is satisfied. The LCA finishing condition is satisfied when an elapsed time after starting the LCA has reached the target-time-to-change-the-lane. The target-time-to-change-the-lane is a target time to change the lane by one lane. From the above, when the LCA finishing condition is satisfied, the lane change is finished.

It should be noted that, while the LCA is being performed, the DSECU 20 transmits to the meter ECU 30 the blinking instruction to blink a winker positioned in a direction of the lane change. Thereby, the winker 31 positioned in the direction of the lane change blinks during the LCA being performed. Besides, while the LCA is being performed, the DSECU 20 transmits to the CAN 100 an LCA monitoring signal indicating whether or not the LCA is being performed. For example, the LCA monitoring signal of "1" indicates that the LCA is being performed and the LCA monitoring signal of "0" indicates that the LCA is not being performed. Therefore, other ECUs can grasp a performing status of the LCA by reading the LCA monitoring signal.

The lane change assist system of the present disclosure comprises the DSECU 20, the meter ECU 30, the EPS ECU 40, the brake ECU 50, the engine ECU 60, and sensors and actuators connected to those ECUs.

<Performing Condition of the Rear PCS Control During the LCA Being Performed>

In the LCA, the target-time-to-change-the-lane is set somewhat long in order to give a sense of security to the driver, and the own vehicle is moved to the adjacent lane slowly by taking time. At a timing of starting the LCA, there do not exist any other vehicles which may collide with the own vehicle. However, it is considered that there appears another vehicle rapidly approaching the own vehicle from rear on the adjacent lane which is to be a new lane for the own vehicle after the lane change in a midst of the lane change being performed slowly (that is, at a low lateral speed) after the LCA is being started.

Figure 6:
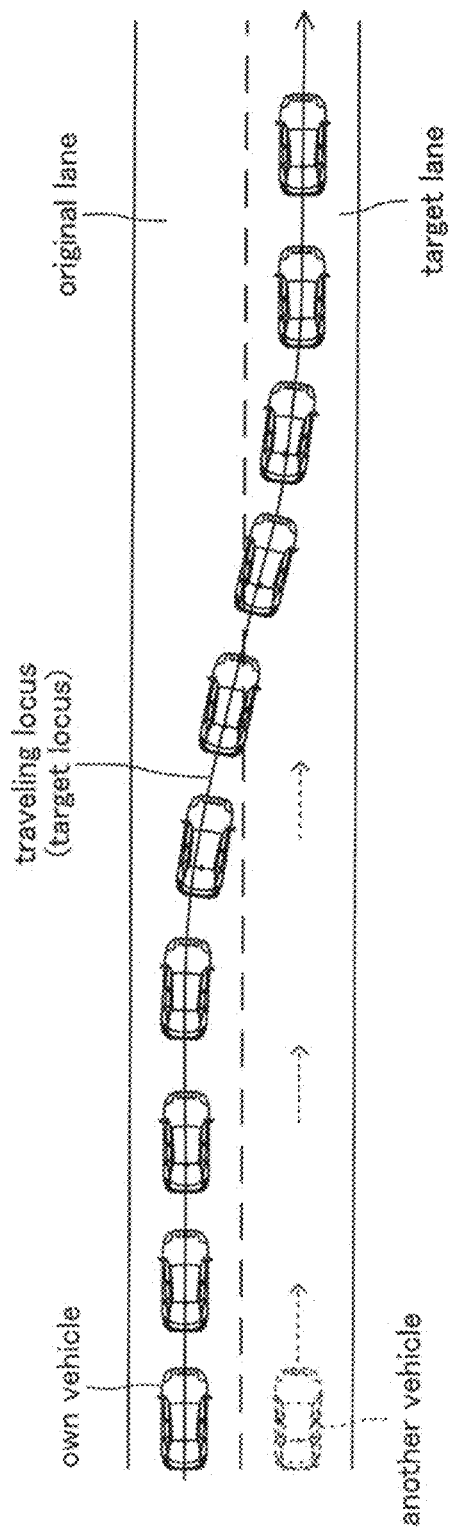
FIG. 6 is a plan view showing a traveling locus of an own vehicle when a lane change assist control (LCA) is performed.

As described earlier, a target vehicle of the rear PCS control is a vehicle approaching the own vehicle from rear, traveling on a traveling locus of the own vehicle. Therefore, as shown in FIG. 6, the other vehicle rapidly approaching the own vehicle from rear on the adjacent lane (the target lane) is not immediately regarded as the target vehicle of the rear PCS control. Therefore, there is a possibility that the rear PCS control may be delayed.

Thus, the RLDECU 10 switches a performing condition of the rear PCS control between a case where the LCA is being performed and a case where the LCA is not being performed. The RLDECU 10 makes the rear PCS control be performed more easily when the LCA is being performed compared to when the LCA is not being performed.

Figure 7:
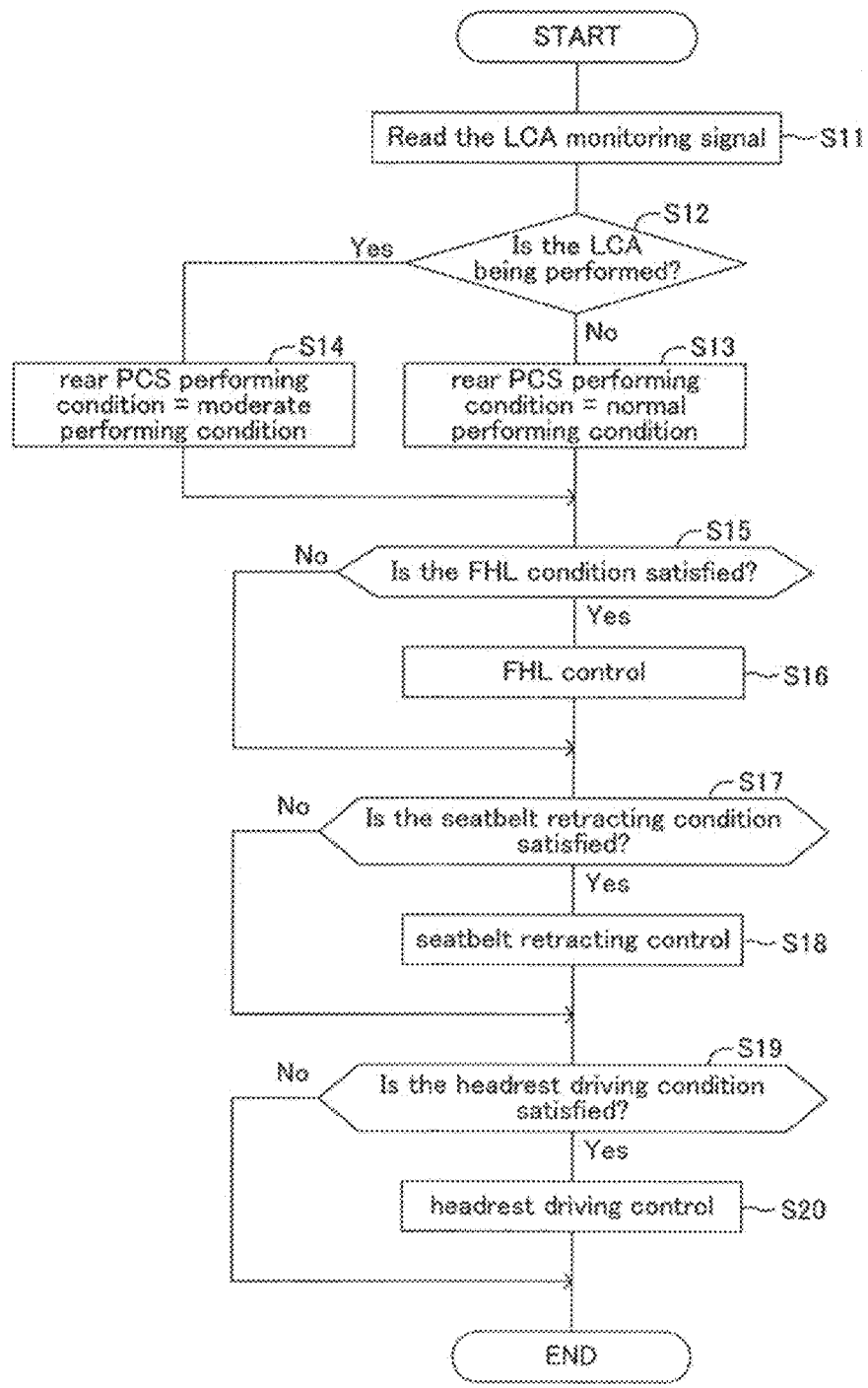
FIG. 7 is a flowchart showing a rear-end pre-crash safety control (rear PCS control) routine.

FIG. 7 shows a routine of the rear PCS control performed by the RLDECU 10. The RLDECU 10 repeats the rear PCS control routine every time the predetermined calculation interval elapses while an ignition switch is being turned on.

When the present routine is activated, the RLDECU 10 reads the LCA monitoring signal at a step S11. Thereafter, the RLDECU 10 determines whether or not the LCA is being performed based on the LCA monitoring signal at a step S12.

When the LCA monitoring signal is "0", that is, when the LCA is not being performed (S12: No), the RLDECU 10 sets a performing condition of the rear PCS control to be a normal performing condition at a step S13. On the other hand, when the LCA monitoring signal is "1", that is, when the LCA is being performed (S12: Yes), the RLDECU 10 sets a performing condition of the rear PCS control to be a moderate performing condition at a step S14.

The normal performing condition is satisfied when the aforementioned performing conditions 1, 2, and 3 are all satisfied. On the other hand, the moderate performing condition is a condition set so that the rear PCS control may be performed more easily, and includes following performing conditions 1' and 3' in place of the performing conditions 1, 2, and 3.

1'. Regard a vehicle approaching from rear of the own vehicle as a target vehicle (A target vehicle condition)

3'. Time to collision (TTC) is less than a moderate threshold value (A TTC condition).

The moderate performing condition is satisfied when these performing conditions 1' and 3' are both satisfied.

The performing condition 1' is a condition where a limitation that "an approaching vehicle is traveling on the traveling locus of the own vehicle" is excluded from the performing condition 1. In the performing condition 1', all vehicles approaching the own vehicle from rear and having a possibility of colliding with the own vehicle are regarded as target vehicles. Therefore, a scope of the target vehicle is expanded, and other vehicles which are not traveling on the traveling locus of the own vehicle are also regarded as the target vehicles.

Besides, the performing condition 3' is a condition where a larger threshold value (a moderate threshold value) is set compared with the threshold value in the performing condition 3. That is, assuming that the threshold value in the normal performing condition is TTCref1 and the moderate threshold value in the moderate performing condition is TTCref2, the TTCref2 is set to a larger value than the TTCref1 (TTCref2>TTCref1:TTCref1=1.0 s, TTCref2=1.4 s, for example). In this case, as is the case with TTCref1, different values of TTCref2s are independently set depending on the FHL control, the seatbelt retracting control, and the headrest driving control, maintaining the aforementioned relationship (TTCref2>TTCref1).

In addition, in the moderate performing condition, the brake condition which is included in the normal performing condition is excluded. Therefore, the rear PCS control can be performed even in a state where the driver is not performing a brake operation. Therefore, when the moderate performing condition is being set as the performing condition of the rear PCS control, the rear PCS control is performed more easily compared to when the normal performing condition is being set.

After setting the performing condition of the rear PCS control (S13, S14), the RLDECU 10 determines whether or not the performing condition of each of the following three rear PCS controls (the FHL control, the seatbelt retracting control, the headrest driving control), is satisfied as will be described below. In this case, the RLDECU 10 obtains the rear lateral information, the vehicle speed information, and the brake information, and makes a determination based on the obtained information.

At a step S15, the RLDECU 10 determines whether or not the performing condition of the FHL control is satisfied, and when satisfied (S15: Yes), performs the FHL control at a step S16. In this case, the RLDECU 10 transmits the hazard lamps blinking instruction to the meter ECU 30. Thereby, the hazard lamps 31 blink. When the performing condition of the FHL control is not satisfied (S15: No), the RLDECU 10 skips the process in the step S16.

Subsequently, at a step S17, the RLDECU 10 determines whether or not the performing condition of the seatbelt retracting control is satisfied, and when satisfied (S17: Yes), performs the seatbelt retracting control at a step S18, this case, the RLDECU 10 transmits the seatbelt retracting instruction to the seatbelt ECU 70. Thereby, the seatbelt is retracted and the passenger is securely restrained onto the seat. When the performing condition of the seatbelt retracting control is not satisfied (S17: No), the RLDECU 10 skips the process in the step S18.

Next, at a step S19, the RLDECU 10 determines whether or not the performing condition of the headrest driving control is satisfied, and when satisfied (S19: Yes), performs the headrest driving control at a step S20. In this case, the RLDECU 10 transmits the headrest driving instruction to the headrest ECU 80. Thereby, the headrest is moved to the position where the headrest makes contact with the head of the passenger. When the performing condition of the headrest driving control is not satisfied (S19; No), the RLDECU 10 skips the process in the step S20.

After performing the determinations of the performing conditions of the three rear PCS controls and the control processes in response to the determination results as described above, the RLDECU 10 tentatively terminates the rear PCS control routine. Thereafter, the RLDECU 10 repeats the rear PCS control routine every time the predetermined calculation interval elapses.

It should be noted that two threshold values for time to collision (TTC) may be prepared, that is, a TTCrefstart threshold value set as a threshold value for determining whether or not to start the rear PCS control and a TTCrefend threshold value set as a threshold value for determining whether or not to finish the rear PCS control (TTCrefstart<TTCrefend), and to switch a threshold value for time to collision (TTC) from the TTCrefstart threshold value to the TTCrefend threshold value once the rear PCS control is started. In this way, a dead zone is set and thereby hunting is prevented when making a determination of whether or not the performing condition is satisfied. Note that it is needless to say that, for each of these threshold values (the TTCrefstart threshold value and the TTCrefend threshold value), different values may be set depending on types of the controls (the FHL control, the seatbelt retracting control, the headrest driving control) in each of the normal performing condition and the moderate performing condition.

According to the vehicle control apparatus of the present embodiment described above, the performing condition of the rear PCS control is switched from the normal performing condition to the moderate performing condition during the LCA being performed. Thereby, a scope of the target vehicle subject to the rear PCS control is expanded so as to include another vehicle not traveling on the traveling locus of the own vehicle, that is, another vehicle approaching the own vehicle while traveling on the adjacent lane. Therefore, the rear PCS control can be performed at an early timing against another vehicle rapidly approaching the own vehicle from rear on the adjacent lane (the target lane) after the LCA is started.

Figure 8:
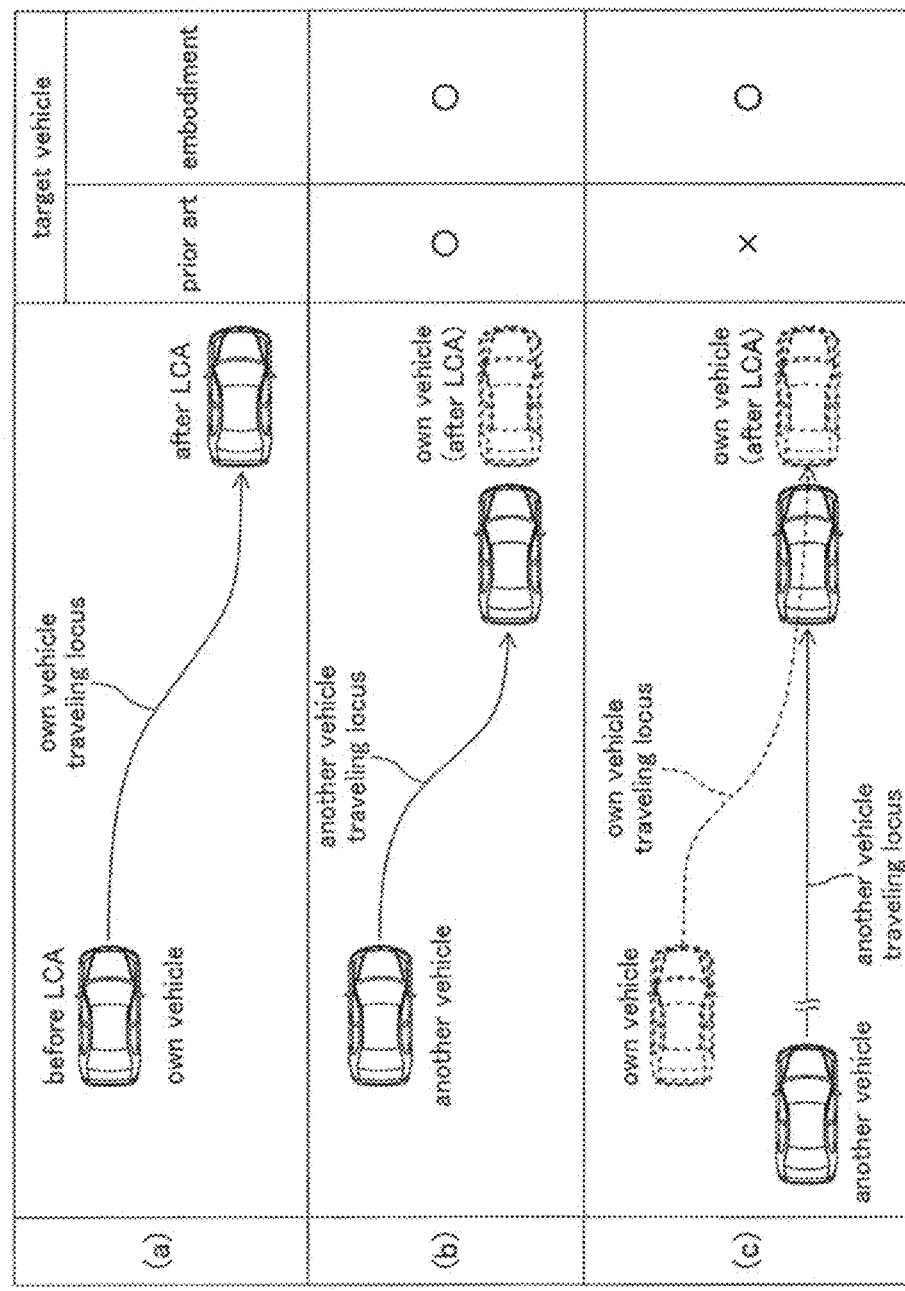
FIG. 8 is a diagram for comparing whether or not another vehicle is applicable to the target vehicle between a prior art apparatus and an embodiment apparatus.

For example, when the own vehicle travels under the LCA as shown in an (a) row in FIG. 8, another vehicle approaching the own vehicle by traveling a same traveling locus as the own vehicle as shown in a (b) row in FIG. 8 is recognized as the target vehicle of the rear PCS control in a prior art apparatus as well. On the other hand, another vehicle approaching the own vehicle by traveling a different route (the adjacent lane) from the own vehicle as shown in a (c) row in FIG. 8 is not recognized as the target vehicle of the rear PCS control in the prior art apparatus, while is recognized as the target vehicle in the apparatus of the present embodiment.

Besides, during the LCA being performed, the rear PCS control is performed even when braking is not being performed. Therefore, the rear PCS control can be performed more easily during the LCA being performed.

Further, during the LCA being performed, the threshold value of the time to collision (TTC) is increased. Thereby, a collision determination for an approaching vehicle (a determination that the time to collision (TTC) is less than the threshold value) is performed earlier. Thus, during the LCA being performed, the rear PCS control can be performed at an early timing against another vehicle rapidly approaching the own vehicle.

As a result, even when there appears another vehicle rapidly approaching the own vehicle on the adjacent lane in a midst of the LCA being performed at a slow lateral speed, the rear PCS control can be performed against this another vehicle at an appropriate timing. Hence, it becomes possible to issue a warning to a driver of the approaching vehicle by blinking the hazard lamps 31 at an early timing. Thereby, an inter-vehicle distance between the own vehicle and another vehicle approaching the own vehicle from rear can be secured. That is, reliability of the LCA and the rear PCS system for the driver of the own vehicle can be maintained. In addition, since the retraction of the seatbelt and the forward movement of the headrest are performed at an early timing, safety performance can be improved.

MODIFICATION EXAMPLE

In the above embodiment, a configuration where the performing condition of the rear PCS control is moderated when performing the LCA is adopted. However, also in a case where the lane change is performed by the driver operating the steering wheel, it is considered that there appears another vehicle in a midst of the lane change rapidly approaching the own vehicle, traveling the adjacent lane which is to be the new lane for the own vehicle after the lane change. In this case also, the rear PCS control may be delayed in the prior art apparatus.

Figure 9:
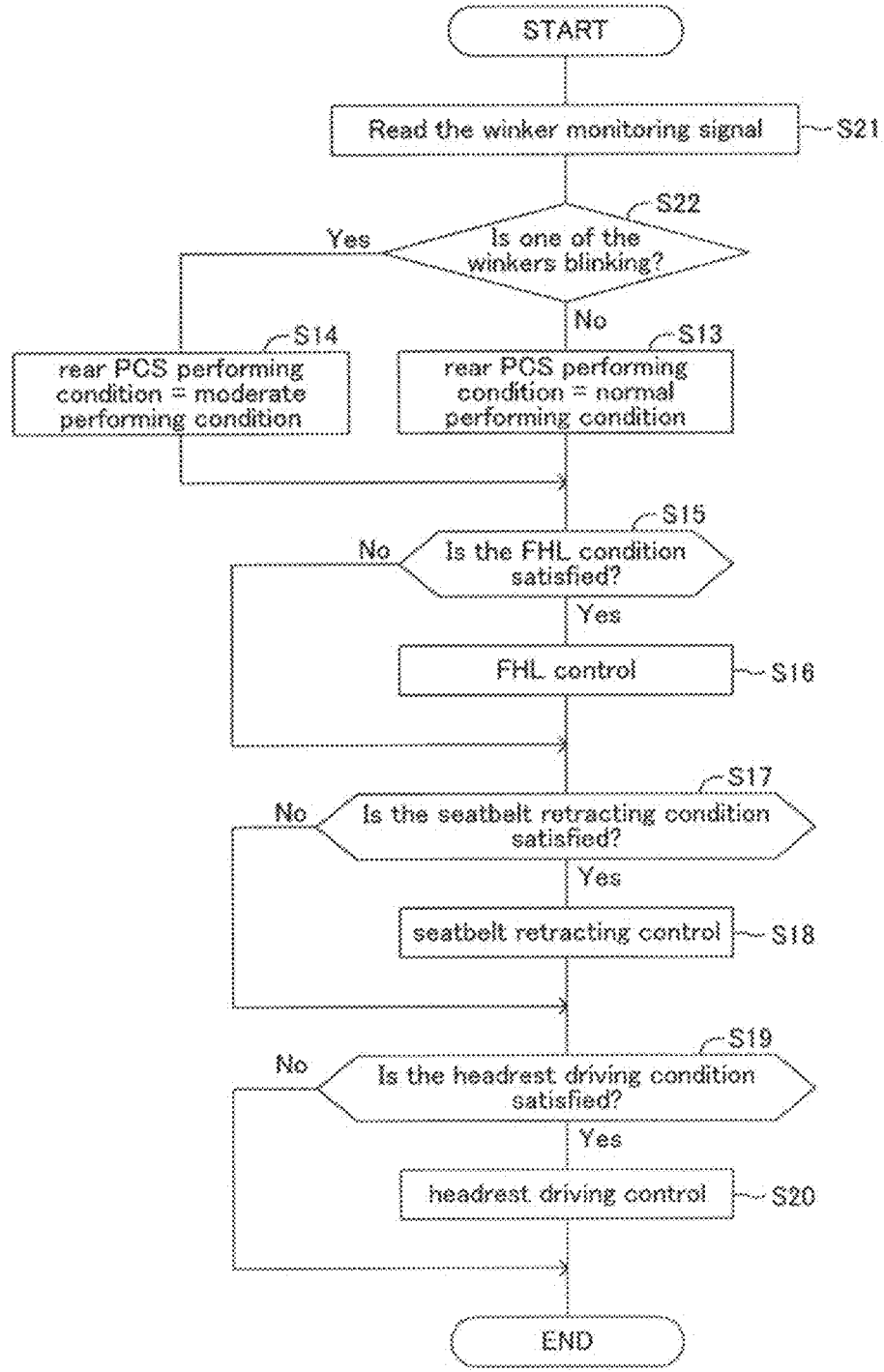
FIG. 9 is a flowchart showing a rear PCS control routine according to a modification example.

Therefore, in this modification example, the performing condition of the rear PCS control is set to the moderate performing condition not only in a case where the LCA is being performed but also in a case where the lane change is performed by the driver operating the steering wheel. FIG. 9 shows a routine of the rear PCS control according to the modification example. In the rear PCS control routine according to the modification example, the processes in the steps S11 and S12 in the rear PCS control routine according to the embodiment (FIG. 7) are replaced to processes in steps S21 and S22, but processes other than these steps remain unchanged. For the processes same as the processes in the embodiment, same step references will be added to, and description thereof will be omitted.

When the present routine is activated, the RLDECU 10 reads a winker monitoring signal at the step S21. Thereafter, the RLDECU 10 determines whether or not one of the left and right winkers 31 is blinking based on the winker monitoring signal at the step S21. When the driver has an intention to change the lane by operating the steering wheel, the driver blinks one of the winkers 31 positioned in the direction of the lane change by operating the winker lever. Besides, also when the LGA is being performed, the DSECU 20 blinks one of the winkers 31 positioned in the direction of the lane change. Therefore, during the lane change being performed, one of the left and right winkers 31 blinks, and the winker monitoring signal indicating that one of the winkers 31 is blinking s transmitted to the CAN 100.

Thus, when one of the left and right winkers 31 is blinking, the RLDECU 10 determines that the lane change is being performed by estimation. When the RLDECU 10 determines that the lane change is being performed (S22: Yes), the RLDECU 10 proceeds to the step S14, while when the RLDECU 10 determines that the lane change is not being performed (S22: No), the RLDECU 10 proceeds to the step S13.

According to this modification example, the performing condition of the rear PCS control is switched from, the normal performing condition to the moderate performing condition not only when the LCA is performed but also when the driver changes the lane by operating the steering wheel. Therefore, as is the case with the embodiment, the rear PCS control can be performed at an early timing against another vehicle rapidly approaching the own vehicle when changing the lane. Hence, safety performance can be improved.

It should be noted that the RLDECU 10 may determine that the lane change is being performed when one of the winkers 31 is blinking after confirming that the own vehicle is traveling on a road where the lane change is allowed with a navigation apparatus (illustration omitted), the camera sensor 23, or the like. In this case, an accuracy of the above determination can be improved.

The vehicle control apparatus according to the embodiment and the modification example have been described. However, the present disclosure is not limited to the aforementioned embodiment and modification example and may adopt various modifications within a scope of the present disclosure.

For example, the radar sensor is used as a sensor for detecting a periphery of the own vehicle in the present embodiment, however, other periphery sensors such as a camera sensor, a laser sensor, and the like for example can be used instead. Besides, mounting positions and numbers of the periphery sensors are not limited to the positions and numbers in the present embodiment.

Besides, in the present embodiment, all of the three performing conditions of the rear PCS control are changed during the lane change being performed so that the rear PCS control is performed more easily. However, a configuration where at least one of those performing conditions is changed during the lane change being performed may be adopted. For example, during the lane change being performed, a configuration where only the performing condition 1 is changed to the performing condition 1', a configuration where only the performing condition 2 is excluded, a configuration where only the performing condition 3 is changed to the performing condition 3', a configuration where the performing condition 1 is changed to the performing condition 1' as well as the performing condition 2 is excluded, a configuration where the performing condition 1 is changed to the performing condition 1' as well as the performing condition 3 is changed to the performing condition 3', a configuration where the performing condition 2 is excluded as well as the performing condition 3 is changed to the performing condition 3', and so on may be adopted.

In addition, the performing conditions of the rear PCS control are not limited to these three conditions. Conditions other than these may be added to the performing conditions, or one or a plurality of these conditions may be excluded.

Further, in the present embodiment, three types of controls, that is, the FHL control, the seatbelt retracting control, and the headrest driving control are performed as the rear PCS control. However, a configuration where any arbitrary one or two controls are performed may be adopted. Besides, types of the rear PCS control are not limited to these three conditions, but may include other types of rear PCS controls. For example, a configuration where a sunroof driving control to close an electric sunroof (illustration omitted) is performed when the performing condition of the rear PCS control is satisfied may be adopted. By closing the electric sunroof, rigidity of the vehicle body is increased, for example. In this case, the RLDECU 10 transmits a closing driving instruction to an electric sunroof ECU (illustration omitted) connected to the CAN 100 when the performing condition of the rear PCS control is satisfied. The electric sunroof ECU drives a motor to close the electric sunroof when receiving the closing driving instruction.

The invention claimed is:

1. A vehicle control apparatus comprising:
    a rear-end pre-crash safety system which performs a rear-end pre-crash safety control which is a control to detect an approaching vehicle approaching an own vehicle from rear, and to enhance safety against a collision of said approaching vehicle with said own vehicle, the rear-end pre-crash safety control being performed in response to satisfying a predetermined performing condition;
    lane change determination means for determining whether or not said own vehicle is changing a lane; and
    performing condition change means for changing said performing condition from a first condition to a second condition in such a manner that said rear-end pre-crash safety control is performed more easily by satisfying the second condition, wherein the second condition is set as the performing condition when it is determined that said own vehicle is changing a lane, compared with a case requiring the first condition to be satisfied when it is not determined that said own vehicle is changing a lane,
    wherein the rear-end pre-crash safety system performs the rear-end pre-crash safety control upon satisfying the second condition after the second condition is set as the performing condition.

2. A vehicle control apparatus according to claim 1 applied to a vehicle comprising a lane change assist system which performs a lane change assist control which is a control to change a lane on which said own vehicle travels by an automatic steering, wherein,
    said lane change determination means is configured to:
        obtain a lane change assist information showing that said lane change assist system is performing said lane change assist control, and
        determine whether or not said own vehicle is changing a lane based on said lane change assist information.

3. A vehicle control apparatus according to claim 2, wherein,
said performing condition includes a target vehicle condition that a target vehicle which is a vehicle subject to said rear-end pre-crash safety control is an approaching vehicle approaching said own vehicle from rear, traveling on a traveling locus of said own vehicle, and
said performing condition change means is configured to change said target vehicle condition in a case when it is determined that said own vehicle is changing a lane in such a manner that said target vehicle includes an approaching vehicle approaching said own vehicle from rear without traveling on said traveling locus of said own vehicle.

4. A vehicle control apparatus according to claim 1, wherein,
said lane change determination means is configured to:
obtain a winker information showing an operating state of a winker, and
determine whether or not said own vehicle is changing a lane based on said winker information.

5. A vehicle control apparatus according to claim 4, wherein,
said performing condition includes a target vehicle condition that a target vehicle which is a vehicle subject to said rear-end pre-crash safety control is an approaching vehicle approaching said own vehicle from rear, traveling on a traveling locus of said own vehicle, and
said performing condition change means is configured to change said target vehicle condition in a case when it is determined that said own vehicle is changing a lane in such a manner that said target vehicle includes an approaching vehicle approaching said own vehicle from rear without traveling on said traveling locus of said own vehicle.

6. A vehicle control apparatus according to claim 1, wherein,
said performing condition includes a target vehicle condition that a target vehicle which is a vehicle subject to said rear-end pre-crash safety control is an approaching vehicle approaching said own vehicle from ear, traveling on a traveling locus of said own vehicle, and
said performing condition change means is configured to change said target vehicle condition in a case when it is determined that said own vehicle is changing a lane in such a manner that said target vehicle includes an approaching vehicle approaching said own vehicle from rear without traveling on said traveling locus of said own vehicle.

7. A vehicle control apparatus according to claim 6, wherein,
said performing condition includes a brake condition that braking is being performed, and
said performing condition change means is configured to exclude said brake condition in a case when it is determined that said own vehicle is changing a lane.

8. A vehicle control apparatus according to claim 7, wherein,
said performing condition includes a time to collision condition that a time to collision indicating an expected time for said approaching vehicle to collide with said own vehicle is less than or equal to a threshold value, and
said performing condition change means is configured to switch said threshold value to a larger value in a case when it is determined that said own vehicle is changing a lane compared with a case when it is not determined that said own vehicle is changing a lane.

9. A vehicle control apparatus according to claim 8, wherein,
said rear-end pre-crash safety system is configured to perform at least one of an approach warning control to issue a warning to a driver of said approaching vehicle by banking a hazard lamp, a headrest driving control to move a position of a headrest forward, and a seatbelt retracting control to retract a seatbelt.

10. A vehicle control apparatus according to claim 6, wherein,
said performing condition includes a time to collision condition that a time to collision indicating an expected time for said approaching vehicle to collide with said own vehicle is less than or equal to a threshold value, and
said performing condition change means is configured to switch said threshold value to a larger value in a case when it is determined that said own vehicle is changing a lane compared with a case when it is not determined that said own vehicle is changing a lane.

11. A vehicle control apparatus according to claim 1, wherein,
said performing condition includes a brake condition that braking is being performed, and
said performing condition change means is configured to exclude said brake condition in a case when it is determined that said own vehicle is changing a lane.

12. A vehicle control apparatus according to claim 1, wherein,
said performing condition includes a time to collision condition that a time to collision indicating an expected time for said approaching vehicle to collide with said own vehicle is less than or equal to a threshold value, and
said performing condition change means is configured to switch said threshold value to a larger value in a case when it is determined that said own vehicle is changing a lane compared with a case when it is not determined that said own vehicle is changing a lane.

13. A vehicle control apparatus according to claim 1, wherein,
said rear-end, pre-crash safety system is configured to perform at least one of an approach warning control to issue a warning to a driver of said approaching vehicle by blinking a hazard lamp, a headrest driving control to move a position of a headrest forward, and a seatbelt retracting control to retract a seatbelt.

* * * * *

UNITED STATES PATENT AND TRADEMARK OFFICE
CERTIFICATE OF CORRECTION

PATENT NO. : 10,723,353 B2
APPLICATION NO. : 15/896717
DATED : July 28, 2020
INVENTOR(S) : Koji Takeuchi Page 1 of 2

It is certified that error appears in the above-identified patent and that said Letters Patent is hereby corrected as shown below:

On the Title Page

Item (72), inventor 1, city, delete "Toyota" and insert --Toyota-shi Aichi-ken--, therefor.

Item (57), abstract, Line 1, delete "RLL" and insert --RLD--, therefor.

In the Specification

In Column 3, Line(s) 41, delete "owe" and insert --own--, therefor.

In Column 4, Line(s) 12, after "at", delete ",".

In Column 5, Line(s) 40, after "according", delete ",".

In Column 6, Line(s) 65, after "detection", delete ",".

In Column 7, Line(s) 11, after "object", insert --,--.

In Column 9, Line(s) 22, after "deviation", delete ".".

In Column 10, Line(s) 60, after "control", delete ",".

In Column 14, Line(s) 15, after "formula", delete ",".

In Column 14, Line(s) 37, delete "EPS-ECU" and insert --EPS·ECU--, therefor.

In Column 15, Line(s) 45, after "timing", delete ",".

In Column 16, Line(s) 63, after "side-by-side", delete ",".

Signed and Sealed this
Tenth Day of November, 2020

Andrei Iancu
*Director of the United States Patent and Trademark Office*

In Column 17, Line(s) 3, after "on", delete ",".

In Column 17, Line(s) 10, delete "EPS ECU" and insert --EPS·ECU--, therefor.

In Column 17, Line(s) 36, delete "EPS ECU" and insert --EPS·ECU--, therefor.

In Column 19, Line(s) 30, after "S19", delete ";" and insert --:--, therefor.

In Column 21, Line(s) 16, after "blinking", delete "s" and insert --is--, therefor.

In the Claims

In Column 22, Line(s) 57, Claim 2, after "claim 1", insert --,--.

In Column 23, Line(s) 41, Claim 6, delete "ear" and insert --rear--, therefor.

In Column 24, Line(s) 16, Claim 9, delete "banking" and insert --blinking--, therefor.